Patented Oct. 14, 1952

2,613,813

UNITED STATES PATENT OFFICE 2,613,813

METHOD OF FILTERING BY ATTRACTING SLUDGE PARTICLES

Clarke A. Rodman, Garden City, N. Y., and Norman L. Tewksbury, Fall River, Mass., assignors to Fram Corporation, a corporation of Rhode Island No Drawing. Application January 27, 1950, Serial No. 140,962

6 Claims. (Cl. 210—62)

This invention relates to filtration, and particularly to the filtration of hydrocarbon oils such as are used either for lubrication or fuel in internal combustion engines, and particularly to the removal of solids and colloids therefrom.

In the use of lubricating or fuel hydrocarbon oil for internal combustion engines, either of the gasoline or diesel types, minute solids occur in the oil due to pyrolytic or oxidation decomposition and are removed by use of some filtering media such as cloth, paper, fibers of various characters such as cotton, rayon, wool, or wood pulp, requiring considerable time to remove such solid particles. Various types of filters, such as the depth type, and the type in which considerable surface area is involved, are utilized.

One of the objects of this invention is to increase sharply the removal of the above mentioned foreign solids and colloids from the oil and collect or adsorb the same upon the filtering media.

Another object of this invention is to effect such sharp increase of removal by means of treatment of filtering media or the oil to be filtered just prior to its passage through the filtering media so as to more efficiently and more quickly attract or accumulate the solid and colloidal particles in the oil on the filtering media.

A more specific object of this invention is to treat the filtering media with a chemical substance which will have an attraction for the solid and colloidal particles to more effectively accumulate them in the filtering media.

It has been found that some of the organic sludge particles formed in the use of the oil have anion activity, especially when dispersed in the oil. Many of these sludge particles have a large number of carboxyl, aldehyde, hydroxyl endings, ketone groupings and polyhydric alcohol groupings, which account for this anion activity. Accordingly, we have found that by treating the filtering media, or the oil which is about to be passed through the filtering media, with some material which is highly cation active, that an attraction is set up which causes the sludge particles which are anion active to be more quickly accumulated upon the filtering media.

It is considered that certain foreign solids or colloids in the oil may have a cation activity. Accordingly, we have found that by treating the filtering media with some material which is highly anion active, that an attraction has been set up which caused the sludge particle or foreign solids and colloids to be more quickly accumulated upon the filtering media. This type of treatment did not accomplish as rapid a removal of the foreign solids and colloids as did the cation active treatments.

It is known that, due to a potential difference, a weak cation active material would be attracted to or picked upon a strong cation active material. Also, it is known that an anion active material would be attracted to or picked up on a cation active material. The converse would be true for these two phenomena in the case of an anion system.

This matter of attraction may be either because of the ionic attraction between the cation and anion groups as a whole, or may be on the basis of polar adsorption, wherein there is an orientation of the molecules whose field of force diminishes as the distance increases from the maximum adsorption layer or this attraction may be of the molecular type wherein the surface of the chemical has an affinity for the surface of the oil decomposition particles and hence an attraction may occur. The ionic attraction and polar adsorption attraction are close in theory and may well be illustrated by the following cation active group of materials having an amine ending such as products formed by the reaction at an elevated temperature of ⅓ mole of glyceride of oleic acid type of which cottonseed and corn oils are examples, with 1 mole commercial diethylene triamine. The reaction is a function of temperature and the time that the material is subjected to such temperature. Thus the higher the temperature, the faster the reaction up to a temperature at which the organic components will decompose, it being understood that the temperature must remain below the point at which such organic components decompose. The reaction is completed when there is no further decrease in alkalinity. The principal product is considered to be the oleic acid mono amide of diethylene triamine

RCONHCH2CH2NHCH2CH2NH2

Products formed by the reaction of the above material with 2 moles of ethylene oxide may also be used as an illustration. The principal product is considered to be the oleic acid mono amide of diethylene triamine diethylene glycol

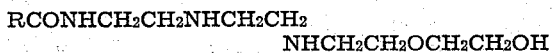
RCONHCH2CH2NHCH2CH2
NHCH2CH2OCH2CH2OH

Another example is illustrated wherein ⅔ mole of a glyceride of oleic acid is used in place of the ⅓ mole. The condensation product with diethylene triamine would be

RCONHCH2CH2NHCH2CH2NHOCR

The second reaction with ethylene oxide would produce the product:

$$RCONHCH_2CH_2NCH_2CH_2NHOCR$$
$$|$$
$$CH_2CH_2OCH_2CH_2OH$$

Other very good results have been obtained from products formed by the reaction of 1/3 mole sperm oil and 1 mole of diethylene triamine which products were then reacted with 2 moles of ethylene oxide. In each of the above cases, amine endings are present. Other materials which may be utilized are the fatty acid amides, which are as follows: dioleic amide of diethylene triamine, lauric mono amide diethylene triamine, ricinoleic mono amide diethylene triamine; or the reaction of ethylene oxide with any of the above. The ethylene oxide reaction may be either an addition on the end amine group or if carried further additions would occur progressively on the next to the end amine group or the group second from the end.

It is felt that the above amines or amine amides have two cation reactive groups, one a strong NH group and one weak $NH_2$ group. In the case of the polar adsorption theory, the groups may be either primary as an $NH_2$ group, secondary as an NH group.

Polar adsorption is another consideration of contaminant pick up other than the ionic attraction or pick-up described above. Such an adsorption causes an orientation of molecules whose field of force diminishes as the distance increases from the initial adsorption layer. This theory accounts for the possibility of a porous filter cake forming on the outer surface of the filter media. Consider the adsorption of a fatty acid on a water surface. The carboxyl polar group penetrates the water interface, and the fatty acid radical extends vertically above the water surface. We find that the second molecule of fatty acid is adsorbed with the radical attracted to the radical of the first molecular film. In the third molecular film, the polar groups attract each other, etc. This orientation caused by the field of force set up by the first adsorption of the carboxyl group in the water continues until the diminishing field of force has little or no effect on succeeding molecules.

```
  \  \  \  /  \  |  /
   ●  ●  ●  ●  ●  ● ●
   |  |  |  |  |  | |
   ○  ○  ○  ○  ○  ○ ○
   |  |  |  |  |  | |
  ─┼──┼──┼──┼──┼──┼─┼─ Water surface
   ●  ●  ●  ●  ●  ● ●
``` where

● is the carboxyl group, and
— is the fatty acid radical chain.

In a filter system with carboxyl groups on the filter media's surface and sludge particles with carboxyl endings, we would expect from the above theory an adsorption build-up on the filter media as follows:

```
  \  |  \  |  \  /  /
  ●  ●  ○  ●  ●  ● ●
  ●  ●  ●  ●  ●  ● ●
  |  |  |  |  |  | |
  ●  ●  ●  ●  ●  ● ●
  ─────────────────── Filter media
  ○  ●  ●  ●  ○  ● ●  surface
```

An OH or CHO rather than the full COOH ending could cause a similar effect. Any of the amines could be considered polar endings and polar adsorption similar to that described above could occur. We do not know all the polar endings existent in lube oil sludge. It is very possible that polar endings akin to the amine groups might exist and that polar adsoption as well as electrophoresis or ionic attraction could very well exist together.

It would seem in theory that the surfaces of I.

$$RCONHCH_2CH_2NHCH_2CH_2NH_2$$

or II.

$$RCONHCH_2CH_2NHCH_2CH_2NHCH_2CH_2OCH_2CH_2$$

would tend to attract oil contaminants, some of which are (1) High molecular aliphatic aldehydes, which have $$-C\begin{smallmatrix}\nearrow O \\ \searrow H\end{smallmatrix}$$

endings (2) High molecular aliphatic ketones, which have $$-\overset{O}{\underset{\|}{C}}-$$

groupings (3) High molecular aliphatic alcohols, which have —$CH_2OH$ endings
(4) High molecular unsaturate chain hydrocarbon resin isomers and polymers, which have CH=CH groupings
(5) High molecular fatty acids which have —COOH endings
(6) High molecular polyhydric ethers having —$CH_2OCH_2$— groupings
(7) High molecular carbonaceous material—mostly carbon $$-\overset{|}{\underset{|}{C}}-\overset{|}{\underset{|}{C}}-$$

groupings.

It is assumed that the
$$-NHCH_2CH_2NHCH_2CH_2NH_2$$
or
$$-NHCH_2CH_2NHCH_2CH_2NHCH_2CH_2OCH_2CH_2OH$$

groupings attract the $$C\begin{smallmatrix}\nearrow O \\ \searrow H\end{smallmatrix}, -C\overset{\nearrow O}{}$$

$CH_2OH$ and —$CH_2OCH_2$— groupings of the contaminants, there is also a possibility for the resinous matter to polymerize with or condense on ethylene group chains. The contaminant fatty acids having COOH endings probably absorb on —$NHCH_2CH_2NHCH_2CH_2NH_2$— or $$-NHCH_2CH_2NHCH_2CH_2NHCH_2CH_2OCH_2CH_2OH$$

but would tend more to adsorb on the R radical. It is felt that the oil molecule carrying contaminant molecules with it would wet on the fatty acid chain R which is similar in structure with the oil molecule and that the contaminant molecules adhere to the poly ethylene chain. The next oil molecule and contaminant molecules adhere on the surface of the first; hence, a contaminant bed is built upon a cellulose chain if it contains a film surface of I or II; or a molecule of I or II in the oil will adsorb a sufficient quantity of contaminant to be picked up by the filter media, chemical and contaminant together, as it comes in contact with the filter media.

This attraction might fall in three theoretical types of attraction:

(1) Ionic
(2) Polar
(3) Molecular which have been described above.

The general classification of the principal products of the group of materials which tend to produce this attraction has been listed in our copending application Ser. No. 21,764, filed April 17, 1948, of which this application is a continuation in part, being directed to a material, namely the mono or di fatty acid amide of an alkylene or polyalkylene polyamine whose generic formulae are

RCONH(R₁NH)ₙR₁NHX where

X is H or RCO
RCO is a fatty acid radical, oleic, stearic, ricinoleic and sperm oil are examples
R₁ is an alkylene group, ethylene, butylene are examples n is 0 or any whole number.

Specific examples of this classification would be: The mono fatty acid amide of diethylene triamine

RCONHCH₂CH₂NHCH₂CH₂NH₂ where RCO is a fatty acid radical or the di fatty acid amide of diethylene triamine

RCONHCH₂CH₂NHCH₂CH₂NHOCR where RCO is a fatty acid radical.

These materials thus produced are used for treating filtering materials such as paper or fibers such as natural or synthetic fibers, by immersing the filter material in the above mentioned products while heated to a temperature ranging between 50° to 250° F. In some cases the material is denatured with alcohol or isopropanol solution, in which there are 2-25 parts of the above materials and 98-75 parts of alcohol. In some cases, additions of the above solution to a paper beater, paper pulp, or paper may be utilized. Thread waste or fiber blends may be likewise treated by immersion in the above solution. These materials may be converted to other forms to facilitate their application to a specific filter medium, for example, the conversion of the compound to an acetate salt for using in water emulsion or solution treatments. The treatment may also be by gravity feeding the material from a hopper onto the filtering materials within the above temperature range, but usually at room temperature.

In some cases instead of treating the filter media as above indicated, ionic or other nonionic materials may be placed in the oil to be filtered just prior to its passage through the filter media and advantageous results will be found to be performed.

From our experimentation on the aforementioned chemical compounds used as treatments for filter medias, the following example is cited:

*Example A.*—A filter cartridge whose filtering surface consisted of paper was immersed in a solution of one of the diethylene amine fatty acid amides, namely the compound containing as its chief component the mono oleic amide of diethylene triamine, mentioned above consisting of 12.5 parts by weight of the compound and 82.5 parts by weight of isopropanol. The cartridge which was then installed in a suitable test unit was then subjected to a recirculation lubricating oil test, to which oil a given amount of natural sludge was added at a specified rate. An index classification system has been established whose unit 1 is equivalent to the oil contamination with no filter cartridge in the circulation system. The cartridge treated with this diethylene amine amide has an index for this particular test of 10, while an untreated index of 2. The higher the index, the better cartridge tested under similar conditions has an the filter performance.

From experimental data, the following treated papers are indexed comparatively as follows:

Paper treated with a compound containing:

| | Index |
|---|---|
| (1) No treatment | 2 |
| (2) Example A: the mono oleic amide of diethylene triamine | 10 |
| (3) The mono lauric amide of diethylene triamine | 6 |
| (4) The mono ricinoleic amide of diethylene triamine | 7 |
| (5) The di oleic amide of diethylene triamine | 5 |
| (6) The mono stearic amide of diethylene triamine | 5 |
| (7) The mono sperm oil amide of diethylene triamine diethylene glycol | 8 |
| (8) The mono oleic amide of diethylene triamine diethylene glycol | 12 |

Compound 2 was made by taking one-half to two-thirds moles of corn oil which is a glyceride of oleic acid and reacting it with one mole of diethylene triamine at a temperature of over 300° F. until such time as there is no further decrease in the alkalinity of the compound during the reaction.

Compound 5 was manufactured by using two-thirds to four-thirds moles of corn oil reacted with diethylene triamine by means of the same heat reaction. In both cases suitable catalysts were used. All of the other compounds in this category were compounded accordingly, utilizing different fatty acid glycerides and alkylene or polyalkylene polyamines. In the case of No. 7 it is difficult to determine whether the material is a mono or di amide of the fatty acid portion of sperm oil.

Some compounds were produced utilizing relatively pure fatty acids. One mole of fatty acid was used with one mole of the diethylene triamine to make the mono amides and two moles of the fatty acid were used with one mole of the diethylene triamine to make the di amides. Although both mono and di amides would co-exist in either compound, the predominance of mono or di amides exists as a function of the molarity of the fatty acid used.

We claim:

1. A method of attracting or adsorbing the pyrolytic and oxidation decomposition products of a hydrocarbon oil forming a contaminant in said oil for removing said contaminant from said oil, which method comprises collecting on a media, contaminant from the oil which has been contacted with a composition containing as the essential ingredient at least one of the compounds whose generic formulae is

RCONH(R₁NH)ₙR₁NHX where
X is H or RCO
RCO is a fatty acid radical
R₁ is an alkylene or olefin group
n is 0 or any whole number, the compound being prepared by reacting an alkylene polyamine and a material selected from the group consisting of fatty acids and fatty acid glycerides at an elevated temperature and for a length of time until there is no longer a decrease of alkalinity.

2. A method according to claim 1 wherein there is 1/3 to 2/3 mole of a glyceride of oleic acid type with 1 mole of diethylene triamine.

3. A method according to claim 1 wherein there is 1/3 to 2/3 mole of a glyceride of ricinoleic acid type with 1 mole of diethylene triamine.

4. The method as set forth in claim 1 wherein the said material for contacting the oil is carried by the media on which the contaminant is collected.

5. A method according to claim 1 wherein there is 2/3 to 4/3 mole of a glyceride of oleic acid type with 1 mole of diethylene triamine.

6. A method according to claim 1 wherein there is 2/3 to 4/3 mole of a glyceride of ricinoleic acid type with 1 mole of diethylene triamine.

CLARKE A. RODMAN.
NORMAN L. TEWKSBURY.

REFERENCES CITED

The following references are of record in the file of this patent:

UNITED STATES PATENTS

| Number | Name | Date |
|---|---|---|
| 2,252,554 | Carothers | Aug. 12, 1941 |
| 2,343,430 | Wells et al. | Mar. 7, 1944 |
| 2,343,436 | Wells et al. | Mar. 7, 1944 |
| 2,367,384 | Tymstra et al. | Jan. 16, 1945 |